United States Patent
Hu et al.

(10) Patent No.: US 12,468,552 B2
(45) Date of Patent: *Nov. 11, 2025

(54) EXECUTION OF SUB-APPLICATION PROCESSES WITHIN APPLICATION PROGRAM

(71) Applicant: Tencent Technology (Shenzhen) Company Limited, Guangdong (CN)

(72) Inventors: Hao Hu, Shenzhen (CN); Haojun Hu, Shenzhen (CN); Qingjie Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 43 days.

This patent is subject to a terminal disclaimer.

(21) Appl. No.: 18/519,734

(22) Filed: Nov. 27, 2023

(65) Prior Publication Data

US 2024/0095043 A1   Mar. 21, 2024

Related U.S. Application Data

(63) Continuation of application No. 16/354,371, filed on Mar. 15, 2019, now Pat. No. 11,868,785, which is a
(Continued)

(30) Foreign Application Priority Data

Dec. 5, 2016 (CN) .......................... 201611104220.4

(51) Int. Cl.
*G06F 9/445* (2018.01)
*G06F 9/54* (2006.01)

(52) U.S. Cl.
CPC ...... *G06F 9/44505* (2013.01); *G06F 9/44521* (2013.01); *G06F 9/44578* (2013.01); *G06F 9/542* (2013.01)

(58) Field of Classification Search
CPC ............. G06F 9/44505; G06F 9/44521; G06F 9/44578; G06F 9/542
(Continued)

(56) References Cited

U.S. PATENT DOCUMENTS

| | | | |
|---|---|---|---|
| 5,539,920 A | 7/1996 | Menand et al. | |
| 5,734,380 A | 3/1998 | Adams et al. | |

(Continued)

FOREIGN PATENT DOCUMENTS

| | | | |
|---|---|---|---|
| CN | 102650952 A | 8/2012 | |
| CN | 102663003 A | 9/2012 | |

(Continued)

OTHER PUBLICATIONS

"Teaching you to understand WeChat's Mini Programs' Life Cycle and Operating Principles", 2 pages, Nov. 11, 2016.

(Continued)

*Primary Examiner* — Paul R. Myers
(74) *Attorney, Agent, or Firm* — ArentFox Schiff LLP (57) ABSTRACT

Aspects of the disclosure provide a method and an apparatus for information processing. For example, the apparatus includes a storage medium, processing circuitry and network interface circuitry. The storage medium stores a first application program, and other application programs that are downloaded via the network interface circuitry. The processing circuitry executes the first application program in an operating system to provide a running environment. Further, the processing circuitry executes a second application program in the running environment to start a logic process and a first view process corresponding to a first view page of the second application program. The logic process and the first view process respectively interface with the running environment. The logic process generates initial first page data, and the initial first page data is transferred from the logic
(Continued)

process to the first view process. The first view page is rendered in the first view process.

20 Claims, 7 Drawing Sheets

Related U.S. Application Data continuation of application No. PCT/CN2017/113066, filed on Nov. 27, 2017.

(58) Field of Classification Search
USPC .......................................................... 713/2
See application file for complete search history.

(56) References Cited

U.S. PATENT DOCUMENTS

| | | | |
|---|---|---|---|
| 5,944,784 | A | 8/1999 | Simonoff et al. |
| 6,393,605 | B1* | 5/2002 | Loomans ............ G06F 9/44526 |
| | | | 717/121 |
| 6,560,604 | B1 | 5/2003 | Fascenda |
| 6,934,722 | B1* | 8/2005 | Goshey ............... G06F 11/1461 |
| | | | 717/109 |
| 7,275,086 | B1 | 9/2007 | Bodnar |
| 7,325,204 | B2 | 1/2008 | Rogers |
| 7,533,121 | B2 | 5/2009 | Hilerio et al. |
| 10,310,723 | B2 | 6/2019 | Rathod |
| 10,990,265 | B2 | 4/2021 | Rathod |
| 11,868,785 | B2* | 1/2024 | Hu ....................... G06F 9/44505 |
| 2004/0078422 | A1 | 4/2004 | Toomey |
| 2005/0097557 | A1* | 5/2005 | Bradfield ............. G06F 16/957 |
| | | | 707/E17.119 |
| 2005/0223392 | A1 | 10/2005 | Cox et al. |
| 2005/0262085 | A1* | 11/2005 | Durocher ............. G06Q 10/10 |
| | | | 707/999.009 |
| 2006/0059127 | A1 | 3/2006 | Berry et al. |
| 2008/0114993 | A1* | 5/2008 | Shankar ............. G06F 21/6209 |
| | | | 713/193 |
| 2008/0155542 | A1 | 6/2008 | Maigne et al. |
| 2008/0222660 | A1 | 9/2008 | Tavi et al. |
| 2008/0294598 | A1 | 11/2008 | Imai |
| 2009/0282401 | A1 | 11/2009 | Todorova |
| 2011/0023047 | A1* | 1/2011 | Memik ................ G06F 9/4843 |
| | | | 718/104 |
| 2011/0173239 | A1 | 7/2011 | Sayed et al. |
| 2011/0276919 | A1 | 11/2011 | Massand |
| 2012/0066675 | A1 | 3/2012 | Shelansky et al. |
| 2012/0278750 | A1 | 11/2012 | Abraham et al. |
| 2013/0042201 | A1 | 2/2013 | Sandman et al. |
| 2013/0239089 | A1 | 9/2013 | Eksten et al. |
| 2014/0082584 | A1* | 3/2014 | Kim ......................... G06F 8/20 |
| | | | 717/124 |
| 2014/0089947 | A1* | 3/2014 | Han ....................... G06F 3/048 |
| | | | 719/328 |
| 2014/0281897 | A1 | 9/2014 | Goodger et al. |
| 2017/0346864 | A1* | 11/2017 | Nataros ................... H04L 65/70 |
| 2019/0065216 | A1 | 2/2019 | Kohn |

FOREIGN PATENT DOCUMENTS

| | | |
|---|---|---|
| CN | 103246529 A | 8/2013 |
| CN | 104461632 A | 3/2015 |
| CN | 105573914 A | 5/2016 |
| CN | 105630461 A | 6/2016 |
| CN | 106598655 A | 4/2017 |
| WO | 2012/148867 A1 | 11/2012 |

OTHER PUBLICATIONS

"WeChat Small Process Principle", https://www.jianshu.com/p/fe7a8737680f, Nov. 15, 2016.
"What is the Essence of WeChat Mini Program? Hybrid App", 1 page, Nov. 22, 2016.
Chinese Office Action dated Apr. 18, 2019 in Chinese Patent Application No. 201611104220.4 with Concise English Translation.
Chinese Office Action dated Jun. 20, 2019 in Application No. 201611104220.4 with partical English Translation.
Combined Office Action and Search Report dated Feb. 19, 2019 in Chinese Patent Application No. 2016111104220.4 (with Concise English translation).
International Search Report and Written Opinion received for PCT Patent Application No. PCT/CN2017/113066, mailed on Jan. 12, 2018, 14 pages (7 pages of English Translation and 7 pages of Original Document).

* cited by examiner

EXECUTION OF SUB-APPLICATION PROCESSES WITHIN APPLICATION PROGRAM

RELATED APPLICATION

The present application is a continuation of U.S. application Ser. No. 16/354,371, filed on Mar. 15, 2019, which is a continuation of International Application No. PCT/CN2017/113066, filed on Nov. 27, 2017, which claims priority to Chinese Patent Application No. 201611104220.4, entitled "APPLICATION PROGRAM PAGE PROCESSING METHOD AND DEVICE" filed with the Chinese Patent Office on Dec. 5, 2016. The entire disclosures of the prior applications are hereby incorporated by reference in their entirety.

FIELD OF THE TECHNOLOGY

This application relates to the field of computers, and particularly, to an application program page processing method and an application program page processing device.

BACKGROUND OF THE DISCLOSURE

Application program is a coded instruction sequence executed by a terminal capable of processing information such as a computer, so as to achieve a certain result, or a symbolized instruction sequence or a symbolized statement sequence that can be converted into a coded instruction sequence automatically. At present, a user can install various application programs on a terminal, such as a photographing application program, a social application program, or a mail application program, and various functions, such as a photographing function, a social function, and an e-mail management function, can be implemented by the application programs installed on the terminal.

However, at present, a user needs to download an application program installation package from network first, decompress the application program installation package on a terminal, places various decompressed files in a specified installation directory, registers the application program in an operating system, and generates an icon of the application program, and then, the user can start and use the application program by clicking the icon. Therefore, an application program is installed and used after a series of time-consuming and troublesome steps at present, resulting in a low utilization rate of an application program.

SUMMARY

On the basis of this, it is necessary to provide an application program page processing method, an application program page processing device, and a storage medium so as to resolve the current problem that the utilization rate of an application program is low.

Aspects of the disclosure provide a method and an apparatus for information processing. In some examples, the apparatus includes a storage medium, processing circuitry and network interface circuitry. The storage medium stores a first application program, and other application programs that are downloaded via the network interface circuitry. The processing circuitry executes the first application program in an operating system. The execution of the first application program provides a running environment for other application programs. Further, the processing circuitry executes a second application program in the running environment that is provided by the execution of the first application program. The execution of the second application program starts a logic process and a first view process corresponding to a first view page of the second application program. The logic process and the first view process respectively interface with the running environment that is provided by the execution of the first application program. The logic process generates initial first page data based on first logic code of the first view page. Then the processing circuitry transfers, via the running environment, the initial first page data from the logic process to the first view process. Further, the processing circuitry renders, in the first view process, the first view page according to the initial first page data of the first view page, and feeds back, via the running environment, a completion notification from the first view process to the logic process.

According to an aspect of the disclosure, the processing circuitry transfers, via the running environment, updated data for a portion of the first view page from the logic process to the first view process. Then, the processing circuitry re-renders, in the first view process, the portion of the first view page according to the updated data for the portion of the first view page.

In some embodiments, the processing circuitry acquires, in the running environment, global configuration codes of the second application program based on a program identifier of the second application program. The processing circuitry starts, in the running environment, the logic process and the first view process according to the global configuration codes of the second application program. Further, the processing circuitry registers, in the logic process, the first logic code of the first view page when the logic process of the second application program starts. The processing circuitry acquires, in the logic process, the initial first page data of the first view page, according to the first logic code, after completion of an initialization in the first view process, and sends, via the running environment, the initial first page data of the first view page, from the logic process to the first view process corresponding to the first view page.

In some embodiments, the processing circuitry starts in the running environment, the logic process according to a global logic code in the global configuration codes of the second application program, and starts, the first view process according to a global feature of the first view page that is defined by global page configuration codes in the global configuration codes of the second application program. The global page configuration codes defines global features for view pages of the second application program.

In some embodiments, the processing circuitry acquires, in the first view process, a public component from the running environment that is provided by the execution of the first application program, according to a page configuration file of the second application program. The public component is shared by different application programs that are executed in the running environment. Then, the processing circuitry renders, in the first view process, the first view page according to the public component and the initial first page data of the first view page. Further, in some examples, the processing circuitry acquires in the first view process, an event that binds with the public component, and forwards, via the running environment that is provided by the execution of the first application, the event from the first view process to the logic process. The processing circuitry generates, in the logic process and via an interface provided by the running environment to the public component, updated data for a portion of the first view page in response to the event, according to the logic code of the first view page.

In some embodiments, the processing circuitry acquires, in the logic process, an event that triggers a switching from the first view page to a second view page, and acquires, in the logic process, second page data of the second view page. Further, the processing circuitry transfers, via the running environment, the second page data of the second view page from the logic process to a second view process corresponding to the second view page. The execution of the second application program in the running environment starts the second view process after the first view process starts. The processing circuitry then renders in the second view process, the second view page according to the second page data of the second view page. When the second view page is a new view page, the processing circuitry acquires in the logic process, the second page data according to the logic code of the first view page, and loads, in the logic process, the second page data into a page stack that buffers view pages. When the second view page has been accessed previously, the processing circuitry acquires in the logic process, the second page data from the page stack. The page stack buffers the view pages that have been accessed previously.

In some embodiments, a state change of the first view page from a first state to a second state is triggered in the running environment. Then, the processing circuitry performs an operation that is defined in the first logic code of the first view page by a function associated with the second state.

Aspects of the disclosure also provide a non-transitory computer-readable medium storing instructions which when executed by a computer cause the computer to perform the method for information processing.

Regarding the application program page processing method and the application program page processing device, a parent application program runs on an operating system, the parent application program provides a running environment for the sub-application program logic layer unit and the first sub-application program view layer unit, acquires initial page data through the sub-application program logic layer unit, and implements rendering of the first page through the first sub-application program view layer unit. Thus, when the parent application program is running, a page that belongs to a sub-application program can be implemented, thereby saving time of installing an application program and enhancing use efficiency of the sub-application program. Furthermore, when the first page is changed, only an updated part needs to be rendered, so as to further enhance the use efficiency of the sub-application program. Furthermore, the sub-application program logic layer unit and the first sub-application program view layer unit separate a view layer and a logic layer of the application program, so as to realize and maintain the sub-application program conveniently.

DESCRIPTION OF EMBODIMENTS

To make the objectives, technical solutions, and advantages of the embodiments of this application be more clear and comprehensible, this application will be further described with reference to the accompany drawings and embodiments. It should be understood that, the specific embodiments described herein are only used to interpret this application, rather than limiting this application.

Figure 1:
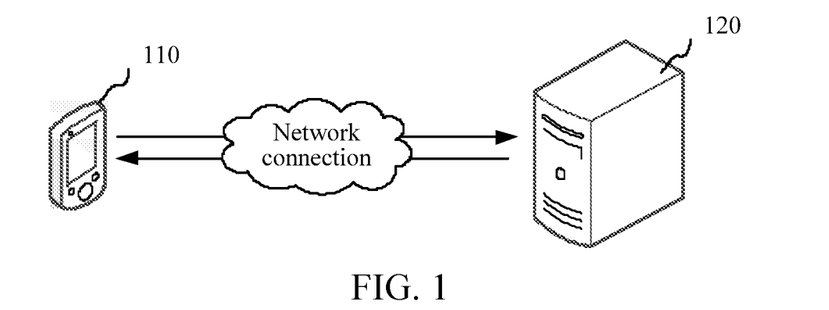
FIG. 1 is a diagram of an application environment of an application program page processing method according to an embodiment.

FIG. 1 is a diagram of an application environment of an application program page processing method according to an embodiment. Referring to FIG. 1, the application program page processing method is applied in an application program page processing system. The application program page processing system includes a terminal 110 and a server 120. The server 120 stores a code package corresponding to a sub-application program identifier. An operating system runs on the terminal 110, a parent application program runs on the operating system, the code package corresponding to the sub-application program identifier is acquired by the parent application program, and a sub-application program logic layer unit and a first sub-application program view layer unit run in an environment provided by the parent application program according to the code package. The terminal 110 specifically can acquire initial page data of a first page through the sub-application program logic layer unit according to logic code of the first page and send the initial page data of the first page to the first sub-application program view layer unit corresponding to the first page; render the first page through the first sub-application program view layer unit according to the initial page data of the first page, and feed back an initial rendering completion notification to the sub-application program logic layer unit; receive the initial rendering completion notification through the sub-application program logic layer unit, then acquire updated page data, and send the updated page data to the first sub-application program view layer unit; and re-render the updated part in the first page through the first sub-application program view layer unit according to the updated page data.

Figure 2:
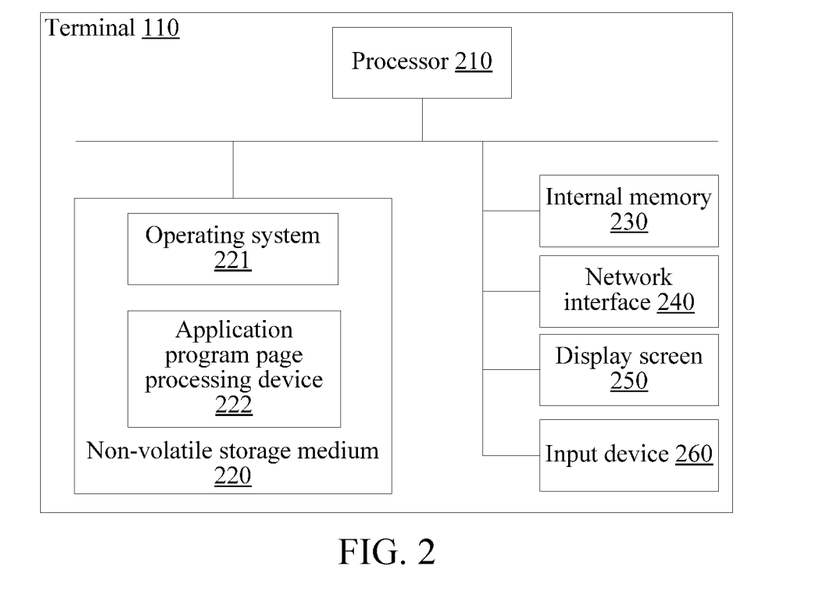
FIG. 2 is a schematic diagram of an internal structure of a terminal according to an embodiment.

FIG. 2 is a schematic diagram of an internal structure of a terminal according to an embodiment. Referring to FIG. 2, the terminal 110 includes a processor 210, a non-volatile storage medium 220, an internal memory 230, a network interface 240, a display screen 250, and an input device 260 connected through a system bus. The non-volatile storage medium 220 of the terminal 110 stores an operating system 221, and further stores an application program page processing device 222. The application program page processing device 222 is configured to implement an application program page processing method. The processor 210 of the terminal 110 is configured to provide computation and control ability to support operation of the whole terminal 110. The internal memory 230 in the terminal 110 provides an environment for operation of the application program page processing device 222 in the non-volatile storage medium 220. The internal memory 230 may store a computer readable instruction and when the computer readable instruction is executed by the processor 210, the processor 210 may perform an application program page processing method. The network interface 240 of the terminal 110 is configured to perform network communications with a server, for example, download a code package corresponding to the sub-application program identifier. The display screen 250 of the terminal 110 may be a liquid crystal display or an electronic ink display screen, and the input device 260 of the terminal 110 may be a touch layer covered on the display screen, may also be a button, a track ball, or a touch pad disposed on a housing of the terminal 110, and further may also be an external keyboard, an external touch pad, or a mouse. The terminal 110 may be a personal computer or a mobile terminal, and the mobile terminal is, for example, a mobile phone, a tablet PC, a personal digital assistant, or a wearable device. A person skilled in the art may understand that, the structure in FIG. 2 is only a block diagram of a part of the structure that is associated with the solution of this application, and do not limit the terminal to which the solution of this application is applied. The specific terminal 110 may include more or less members than those in FIG. 2, have some members combined, or have different member arrangements.

Figure 3:
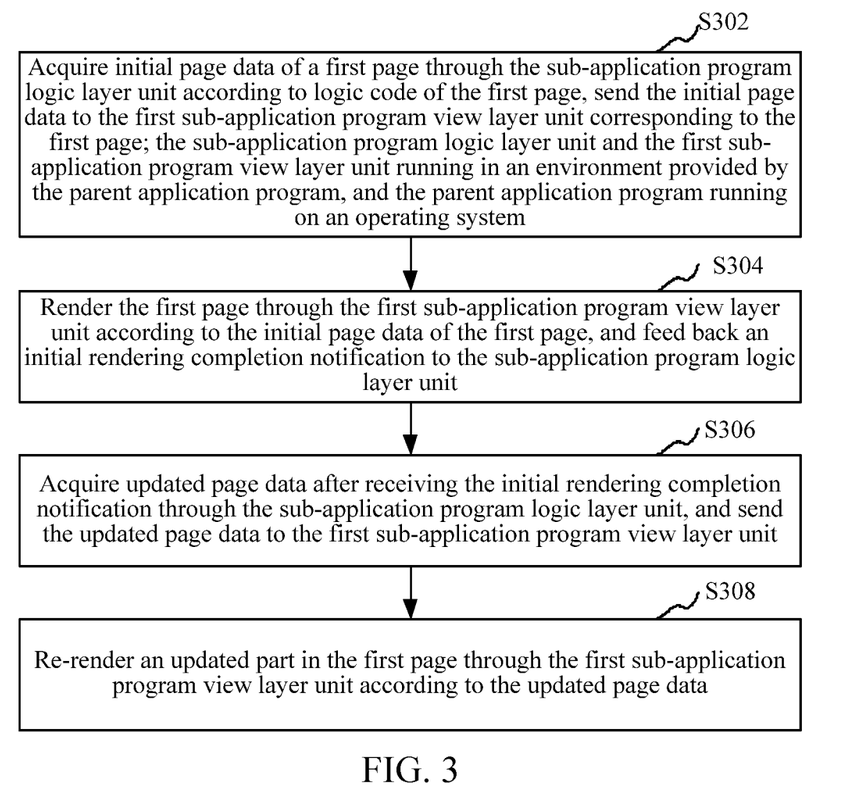
FIG. 3 is a schematic flowchart of an application program page processing method according to an embodiment.

FIG. 3 is a schematic flowchart of an application program page processing method according to an embodiment. In this embodiment, for example, the method is mainly applied to a terminal 110 in FIG. 1. Referring to FIG. 3, the method specifically includes the following steps.

S302: Acquire initial page data of a first page through the sub-application program logic layer unit according to logic code of the first page, send the initial page data of the first page to the first sub-application program view layer unit corresponding to the first page; the sub-application program logic layer unit and the first sub-application program view layer unit running in an environment provided by the parent application program, and the parent application program running on an operating system.

The first page and a second page that will be described subsequently are both sub-application program pages. The logic code of the first page defines data processing logic of the first page, such as processing logic of an event triggered in the first page or data update logic not driven by an event in the first page. The initial page data of the first page is page data pre-defined for the first page and data required for rendering the first page.

Figure 4:
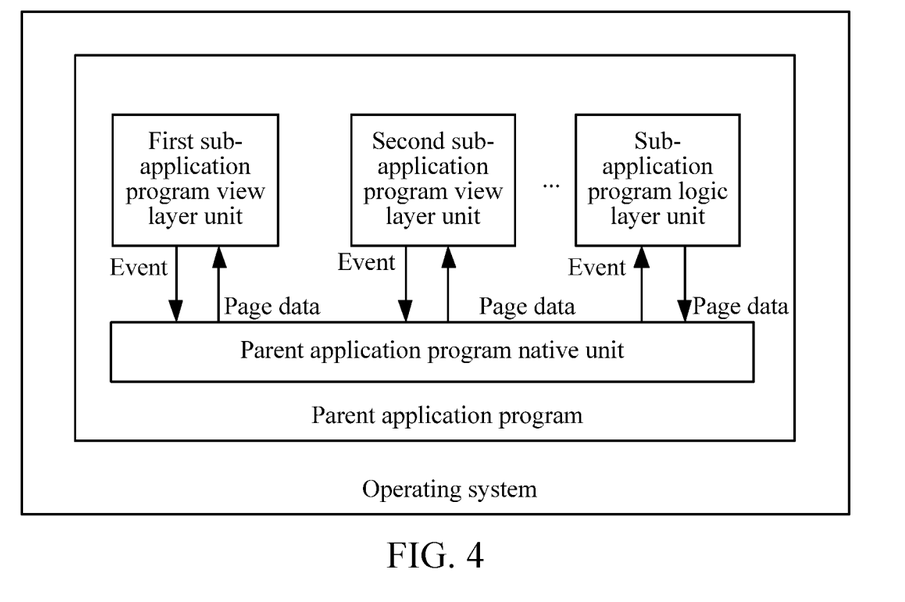
FIG. 4 is a schematic diagram of a relationship of an operating system, a parent application program, a sub-application program view layer unit, and a sub-application program logic layer unit according to an embodiment.

Referring to FIG. 4, the operating system runs on the terminal and the parent application program runs on the operating system. The parent application program provides an environment for operation of the sub-application program, and creates a sub-application program logic layer unit and a corresponding sub-application program view layer unit for implementing a sub-application program.

The operating system (OS) is a computer program for managing and controlling hardware and software resources of a terminal and is most basic system software directly running on a bare terminal. An application program needs to run under the support of the operating system. The operating system may be a desktop operating system such as a Windows operating system, a Linux operating system or a Mac OS, and may also be a mobile terminal operating system such as an iOS or an Android operating system.

The parent application program is an application program for carrying a sub-application program and provides an environment for implementation of the sub-application program. The parent application program is a native application program. The native application program is an application program that can run on an operating system directly. The parent application program may be a social application program, a dedicated application program specially supporting the sub-application program, a file management application program, a mail application program or a game application program. The social application program includes an instant communications application, a Social Network Service (SNS) application or a live application. The sub-application program is an application program that can be implemented in an environment provided by the parent application program. The sub-application program specifically may be a social application program, a file management application program, a mail application program, or a game application program.

The sub-application program logic layer unit and the corresponding sub-application program view layer unit are configured to implement an example of a sub-application program. One sub-application program can be implemented by one sub-application program logic layer unit and at least one sub-application program view layer unit. The sub-application program view layer units may be one-to-one corresponding to the sub-application program pages. The first sub-application program view layer unit is one of at least one sub-application program view layer units, is corresponding to the first page, and is configured to organize the view of the first page and render the first page.

The sub-application program view layer unit is configured to organize and render a view of a sub-application program. The sub-application program logic layer unit is configured to process the sub-application program and data processing logic of a corresponding sub-application program page. The unit may be specifically a process or thread, the sub-application program view layer unit is, for example a sub-application program view layer thread, and the sub-application program logic layer unit is, for example, a sub-application program logic layer thread. The sub-application program logic layer unit may run in a virtual machine. The sub-application program view layer unit and the sub-application program logic layer unit may perform transference and communications through the parent application program native unit, the parent application program native unit is an interface for communications between the parent application program and the sub-application program, and the parent application program native unit may be a thread or process of the parent application program.

The logic code of each sub-application program page includes logic code of the first page and a second page that will be described subsequently, and may be registered by the sub-application program logic layer unit when being started. The first page may be a home page of a sub-application program, so that the sub-application program logic layer unit can directly acquire the initial page data of the first page after being started and send the initial page data of the first page to the first sub-application program view layer unit corresponding to the first page. The first page may also be a sub-application program page specified by the parent application program, so that the sub-application program logic layer unit can acquire the initial page data of the first page after the parent application program specifies the first page and send the initial page data to the first sub-application program view layer unit corresponding to the first page.

S304: Render the first page through the first sub-application program view layer unit according to the initial page data of the first page, and feed back an initial rendering completion notification to the sub-application program logic layer unit.

The initial rendering completion notification is a notification representing that an action of rendering the first page according to the initial page of the first page is completed. The initial page data may be a character or a resource address, and the terminal specifically can draw the character in the first page, and further can acquire resources locally or from network according to the resource address, and draw the acquired resources in the first page.

In an embodiment, the first sub-application program view layer unit may pre-load public resource when being started, and then, after receiving the initial page data of the first page, render the first page according to the public resource required for rendering the first page and the initial page data of the first page, and feeds back an initial rendering completion notification to the sub-application program logic layer unit. The public resource refers to resource shared to generate different sub-application program pages, for example, a rendering engine, public page structure code, or public style data.

S306: Acquire updated page data after receiving the initial rendering completion notification through the sub-application program logic layer unit, and send the updated page data to the first sub-application program view layer unit.

The updated page data is data used to update and render the first page. The terminal can generate updated page data automatically through the sub-application program logic layer unit according to automatically executed code defined in the logic code of the first page. The terminal can also, after receiving an event sent by the first sub-application program view layer unit, make a response to the event through the sub-application program logic layer unit according to the logic code of the first page, so as to generate the updated page data.

S308: Re-render an updated part in the first page through the first sub-application program view layer unit according to the updated page data.

The updated part is a part in the first page that needs to be changed, may be a changed part of the first page compared with rendering according to the initial page data or a changed part of the first page compared with last-time rendering. In specific, the terminal can perform re-rendering through the first sub-application program view layer unit based on the first page obtained by rendering according to the initial page data or perform re-rendering based on the first page that is rendered last time.

Regarding the application program page processing method, the parent application program runs on the operating system, and the parent application program provides a running environment for the sub-application program logic layer unit and the first sub-application program view layer unit, acquires initial page data through the sub-application program logic layer unit, and implements the rendering of the first page through the first sub-application program view layer unit. Thus, when the parent application program is running, the page belonging to the sub-application program can be implemented, thereby saving time of installing an application program and enhancing the use efficiency of the sub-application program. Furthermore, when the first page is changed, only the updated part needs to be rendered, so as to further enhance the use efficiency of the sub-application program. Furthermore, the sub-application program logic layer unit and the first sub-application program view layer unit separate the view layer and the logic layer of the application program, so as to implement and maintain the sub-application program conveniently.

Figure 5:
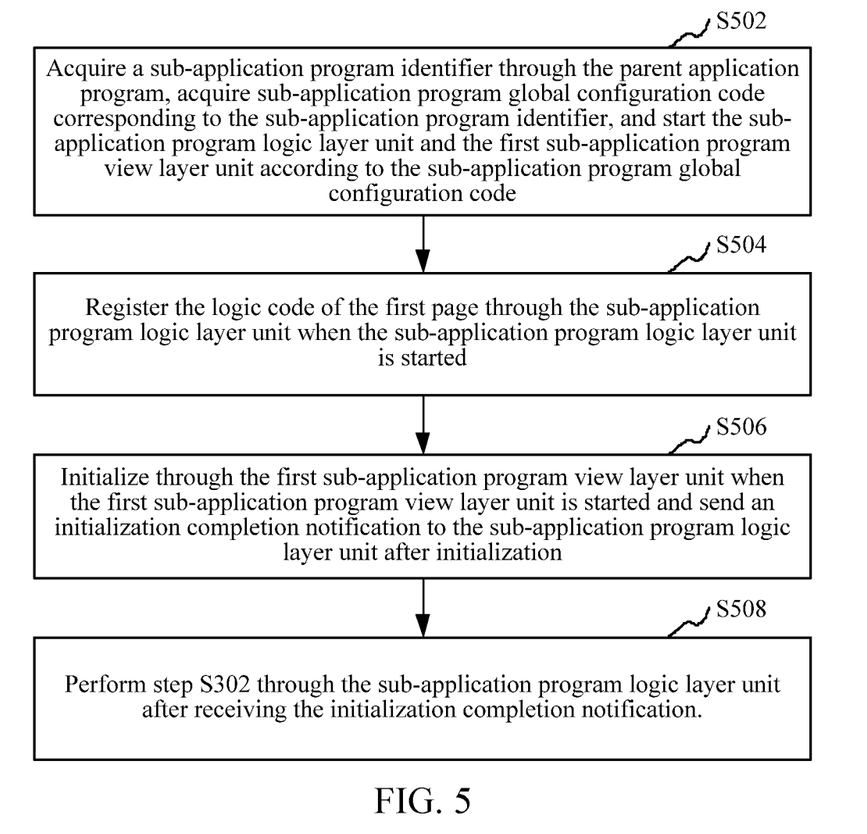
FIG. 5 is a schematic flowchart of the steps of starting the sub-application program logic layer unit and the first sub-application program view layer unit according to an embodiment.

In an embodiment, before step S302, the application program page processing method further includes starting the sub-application program logic layer unit and the first sub-application program view layer unit. Referring to FIG. 5, the step of starting the sub-application program logic layer unit and the first sub-application program view layer unit specifically includes the following steps:

S502: Acquire a sub-application program identifier through the parent application program, acquire sub-application program global configuration code corresponding to the sub-application program identifier, and start the sub-application program logic layer unit and the first sub-application program view layer unit according to the sub-application program global configuration code.

Specifically, the terminal can display a sub-application program list through the parent application program, receive a selection instruction aiming at options in the sub-application program list, and determine a selected option in the sub-application program list according to the selection instruction, so as to acquire the sub-application program identifier corresponding to the selected option. The terminal further can make use records of the sub-application program through the parent application program, so as to acquire the sub-application program identifier corresponding to the sub-application program that is used recently according to the use records of the sub-application.

The sub-application program global configuration code may include sub-application program global logic code and sub-application program page global configuration code. The sub-application program global logic code is used to start the sub-application program logic layer unit, for example, code for describing the sub-application program global logic such as starting and exiting of the sub-application program and backstage operation logic. The sub-application program page global configuration code is used to start the sub-application program view layer unit, for example, code for describing sub-application program page global features such as the path or shared public component of each sub-application program page.

S504: Register the logic code of the first page through the sub-application program logic layer unit when the sub-application program logic layer unit is started.

Specifically, the terminal can acquire the logic code of each sub-application program page according to a storage path of the logic code of each sub-application program page recoded by the application program global logic code corresponding to the sub-application program identifier during a starting process of the sub-application program logic layer unit and registers the acquired logic code of each sub-application program page, so that the sub-application program logic layer unit learns the processing logic of each sub-application program page.

S506: Initialize through the first sub-application program view layer unit when the first sub-application program view layer unit is started and send an initialization completion notification to the sub-application program logic layer unit after initialization.

Initialization is used to enable the first sub-application program view layer unit to prepare for rendering the first page. The terminal specifically can pre-load the public resource through the first sub-application program view layer unit so as to perform initialization and complete initialization after completing pre-loading the public resource.

S508: Perform step S302 through the sub-application program logic layer unit after receiving the initialization completion notification.

Specifically, after initialization, the first sub-application program view layer unit sends the initialization completion notification to the sub-application program logic layer unit, and waits for the initial page data. The sub-application program logic layer unit waits for the initialization completion notification after being started, acquires the initial page data of the first page after receiving the initialization completion notification, and sends the initial page data to the first sub-application program view layer unit corresponding to the first page.

In this embodiment, the parent application program can start the sub-application program logic layer unit and the first sub-application program view layer unit after acquiring the sub-application program identifier, the sub-application program logic layer unit completes registration of the logic code of the first page when being started, and the first sub-application program view layer unit performs initialization when being started, and implements rendering and re-rendering of the first page through sequential interaction between the sub-application program logic layer unit and the first sub-application program view layer unit after initialization, thereby ensuring that the first page can be rendered and updated successfully.

Figure 6:
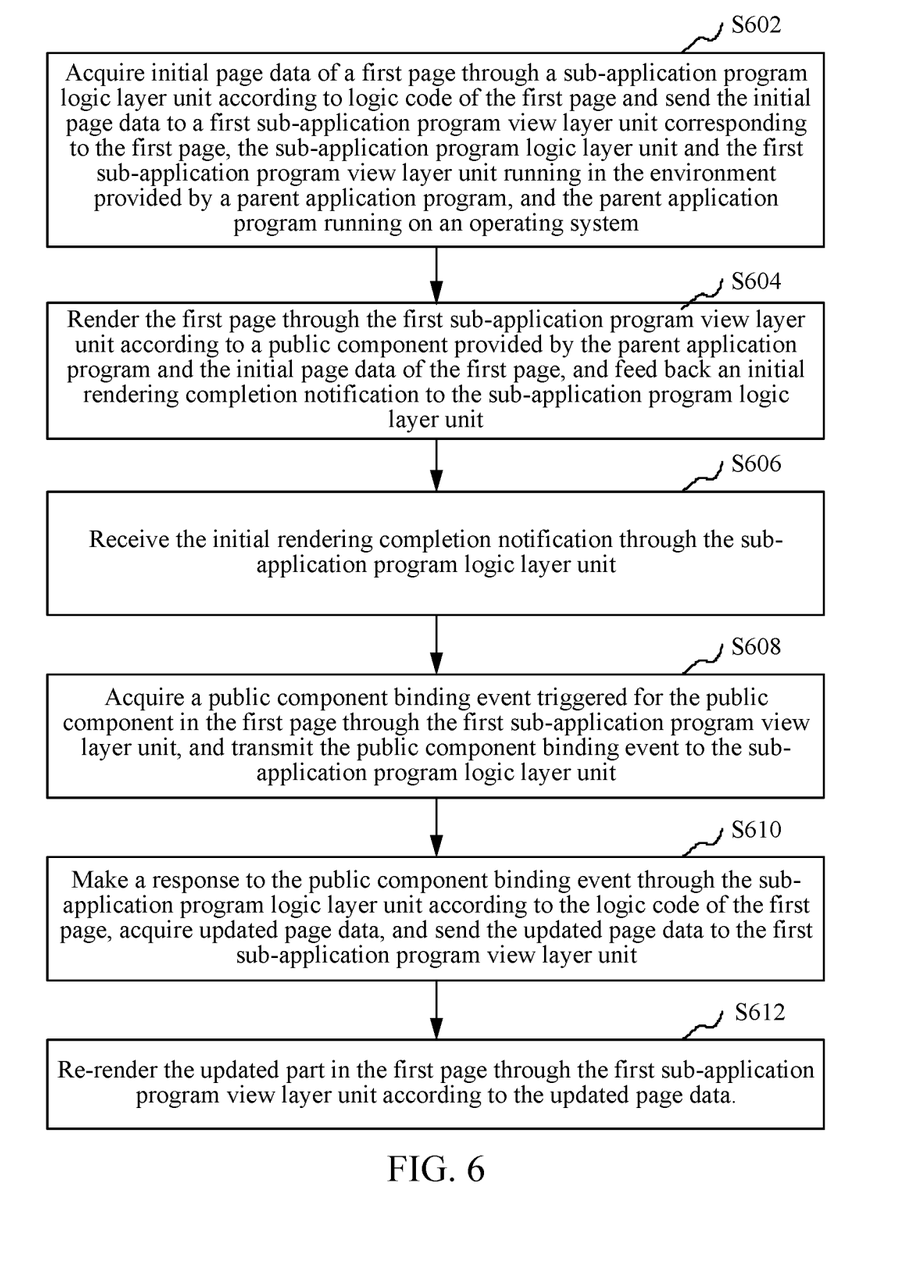
FIG. 6 is a schematic flowchart of the application program page processing method according to another embodiment.

As shown in FIG. 6, in an embodiment, an application program page processing method specifically includes steps S602-S612. Step S604 is included in step S304, and steps S606 to S610 are included in step S306.

S602: Acquire initial page data of a first page through a sub-application program logic layer unit according to logic code of the first page and send the initial page data to a first sub-application program view layer unit corresponding to the first page, the sub-application program logic layer unit and the first sub-application program view layer unit running in the environment provided by a parent application program, and the parent application program running on an operating system.

S604: Render the first page through the first sub-application program view layer unit according to a public component provided by the parent application program and the initial page data of the first page, and feed back an initial rendering completion notification to the sub-application program logic layer unit.

The public component is a component that is provided by the parent application program and can be shared by different sub-application programs, has a visual form, and is a constituent unit of the sub-application program page. The public component can be uniquely identified by a corresponding public component identifier. Different sub-application programs share the public component, and specifically, can invoke the same public component simultaneously or at different moments. The public component can further be shared by the parent application program and the sub-application program.

The initial page data can be associated with or not be associated with the public component, for example, for the public component for displaying a list, the associated initial page data can be initial list data. The terminal renders the first page through the first sub-application program view layer unit according to the public component and the initial page data of the first page, and specifically, renders the page initial data to the associated public component, or arrange and render the initial page data and the public component as parallel page elements.

Specifically, the terminal can acquire a sub-application program page configuration file of the first page through the first sub-application program view layer unit, and then acquire a public component from a public component library provided by the parent application program according to content configured in the sub-application program page configuration file. The sub-application program page configuration file can be acquired locally or from a server. The sub-application program page configuration file is a file for configuring the page displayed by the sub-application program. The sub-application program page configuration file may be source code or code obtained by compiling the source code.

In an embodiment, the terminal can acquire the public component provided by the parent application program and component style data corresponding to the public component through the first sub-application program view layer unit, and then renders the first page according to the public component, the component style data, and the initial page data of the first page. The component style data may include attributes, such as a position, a size, a color, a font, and a word size, of the corresponding public component in the first page. The component style data may be default style data of the public component, and can also be recorded in a style file of the first page.

In an embodiment, the first sub-application program view layer unit can pre-load public resource when being started and acquire the sub-application program page configuration file of the first page, so as to acquire a public component from a public component library provided by the parent application program according to the sub-application program page configuration file, render the first page according to the public resource required for rendering the first page, the public component, and the initial page data of the first page after receiving the initial page data of the first page and feed back an initial rendering completion notification to the sub-application program logic layer unit.

S606: Receive the initial rendering completion notification through the sub-application program logic layer unit.

Specifically, after receiving the initial rendering completion notification sent by the first sub-application program view layer unit through the sub-application program logic layer unit, the terminal learns that the first sub-application program view layer unit has completed first rendering of the first page according to the initial page data, and then, performs re-rendering based on the first page that has been rendered for the first time.

S608: Acquire a public component binding event triggered for the public component in the first page through the first sub-application program view layer unit, and transmit the public component binding event to the sub-application program logic layer unit.

The public component binding event is an event and has a binding relationship with the public component. The binding relationship between the public component binding event and the corresponding public component may be defined in the sub-application program page configuration file of the first page.

Specifically, the terminal can detect a touch point position and determine a public component in the first page covering the touch point position, thereby triggering a public component binding event corresponding to the public component, and transmitting the public component binding event to the sub-application program logic layer unit. In other embodiments, the touch point position can be replaced with a cursor position.

S610: Make a response to the public component binding event through the sub-application program logic layer unit according to the logic code of the first page, acquire updated page data, and send the updated page data to the first sub-application program view layer unit.

Specifically, the terminal can invoke an application program programming interface provided by the parent application program through the sub-application program logic layer unit according to the logic code of the first page, make a response to the public component binding event, and acquire the updated page data.

In an embodiment, the terminal can invoke an application program programming interface provided by an operating system through the sub-application program logic layer unit according to the logic code of the first page, make a response to the public component binding event, and acquire the updated page data.

In an embodiment, the terminal can invoke an application program programming interface provided by the parent application program through the sub-application program logic layer unit according to the logic code of the first page, invoke the application program programming interface provided by the operating system through the application program programming interface provided by the parent application program, make a response to the public component binding event, and acquire the updated page data.

S612: Re-render the updated part in the first page through the first sub-application program view layer unit according to the updated page data.

In an embodiment, through step S604, the parent application program can provide the public component so that the first sub-application program view layer unit can construct the first page quickly, thereby further enhancing the use efficiency of the sub-application program. Furthermore, the first sub-application program view layer unit is responsible for performing initial rendering and re-rendering on the first page and perception of the public component binding event, and the sub-application program logic layer unit performs logic processing on the public component binding event, maintenance can be performed easily for the view layer and the logic layer are separated and interaction logic of the first page can be implemented more easily for the public component binding event is bound with the corresponding public component, thereby reducing development difficulty.

Figure 7:
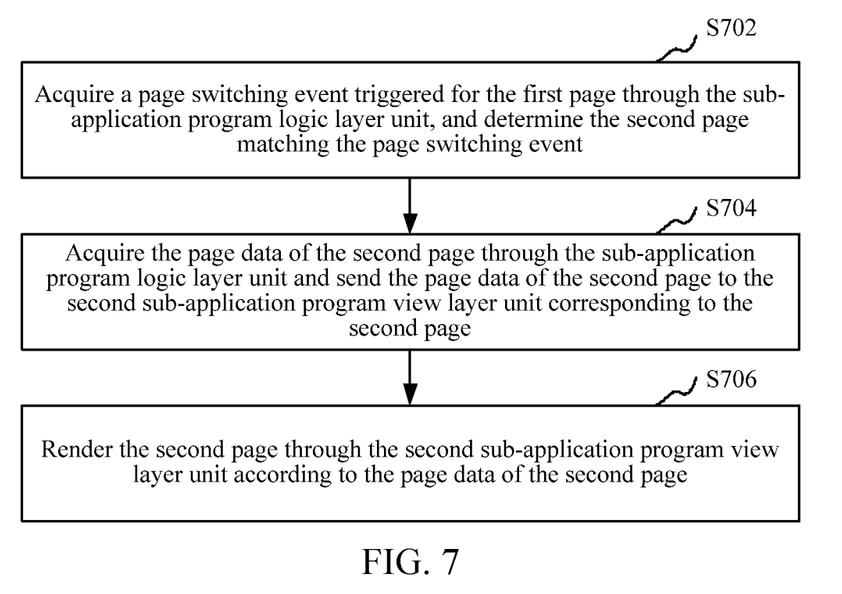
FIG. 7 is a schematic flowchart of the steps of switching a first page to a second page according to an embodiment.

In an embodiment, the application program page processing method further includes switching the first page to a second page. As shown in FIG. 7, the step of switching the first page to the second page includes the following steps:

S702: Acquire a page switching event triggered for the first page through the sub-application program logic layer unit, and determine the second page matching the page switching event.

Specifically, the sub-application program logic layer unit can acquire the page switching event sent by the first sub-application program view layer unit, the parent application program or the operating system. The first sub-application program view layer unit can detect the page switching event triggered in the first page and send the page switching event to the sub-application program logic layer unit. The terminal can detect the page switching event triggered by a physical button for the first page through the operating system, and transmit the page switching event to the parent application program, and then, the parent application program transmits the page switching event to the sub-application program logic layer unit. The page switching event for the first page refers to an event of switching the first page to the second page.

Furthermore, the terminal can determine the second page matching the page switching event through the sub-application program logic layer unit according to a page path defined in the logic code of the first page for an event processing function of the page switching event. Alternatively, the terminal can determine the second page matching the page switching event through the sub-application program logic layer unit according the page path of the second page carried by the page switching event.

S704: Acquire the page data of the second page through the sub-application program logic layer unit and send the page data of the second page to the second sub-application program view layer unit corresponding to the second page.

In an embodiment, step S704 includes acquiring the page data of the second page through the sub-application program logic layer unit according to the logic code of the first page when the page switching event is an event of switching to a new page, loading the page data of the second page into a page stack, and sending the page data of the second page to the second sub-application program view layer unit corresponding to the second page.

Specifically, the page data of the second page acquired according to the logic code of the first page may be the initial page data of the second page. The second sub-application program view layer unit can be started by the parent application program after the first sub-application program view layer unit is started, and the second sub-application program view layer unit pre-loads public resource when being started. After determining the second page, the sub-application program logic layer unit makes the second page correspond to the second sub-application program view layer unit and sends the initial page data of the second page to the second sub-application program view layer unit corresponding to the second page. The page stack is configured to buffer the page data of the sub-application program page that can be returned. The page data in the page stack is in a mode of first-in first-out and last-in last-out.

In an embodiment, step S704 includes: reading the page data of the second page from the page stack through the sub-application program logic layer unit when the page switching event is an event of switching to the page that is accessed last time, and sending the page data of the second page to the second sub-application program view layer unit corresponding to the second page. In this embodiment, a page stack is configured to temporarily store the accessed sub-application program pages, so as to return each of the accessed sub-application program pages layer by layer.

S706: Render the second page through the second sub-application program view layer unit according to the page data of the second page.

Specifically, the second sub-application program view layer unit can pre-load public resource when being started, and then render the second page according to the public resource required for rendering the second page and the page data of the second page after receiving the page data of the second page.

In an embodiment, the terminal can render the second page through the second sub-application program view layer unit according to the public component provided by the parent application program and the page data of the second page. The terminal specifically can acquire the sub-application program page configuration file of the second page through the second sub-application program view layer unit, and then acquire a public component from the public component library provided by the parent application program according to the content configured in the sub-application program page configuration file.

In this embodiment, different sub-application program pages are maintained by different sub-application program view layer units, and page logic management is performed by the same sub-application program logic layer unit, so as to facilitate routing between sub-application program pages and development and maintenance of application programs.

In an embodiment, the application program page processing method further includes: triggering the life cycle state of the first page to change through the parent application program, and performing an action defined by a life cycle function in the logic code of the first page corresponding to the changed life cycle state when monitoring that the life cycle state of the first page is changed through the sub-application program logic layer unit.

Specifically, the terminal can trigger the life cycle state of the sub-application program page to change through the parent application program; and perform the action defined by a life cycle function in the logic code of the sub-application program page corresponding to the changed life cycle state when monitoring the life cycle state of the sub-application program page is changed through the sub-application program logic layer unit. The sub-application program page includes a first page and a second page.

The life cycle state of the first page is a state for describing the life cycle of the first page, for example, a page loading state, a page displaying state, a page hiding state, and a page unloading state. The parent application program native unit can trigger loading, displaying, hiding, and unloading of the first page, so that the first page is changed among the page loading state, the page displaying state, the page hiding state, and the page unloading state.

Furthermore, the logic code of the first page can define life cycle functions corresponding to one or more life cycle states, and the life cycle function can define an action that needs to be performed when a corresponding life cycle state is triggered. When monitoring that the life cycle state of the first page is changed through the sub-application program logic layer unit, if the life cycle function the logic code of the first page corresponding to the changed life cycle state defines an action, the terminal performs the action, and if the life cycle function the logic code of the first page corresponding to the changed life cycle state defines no action, the terminal performs no action.

In this embodiment, the parent application program can trigger a change of the life cycle state of the first page, and perform a corresponding pre-defined action through the sub-application program logic layer unit according to the change of the life cycle state of the first page, so that the sub-application program can implement more functions and the application scope of the sub-application program becomes wider.

Figure 8:
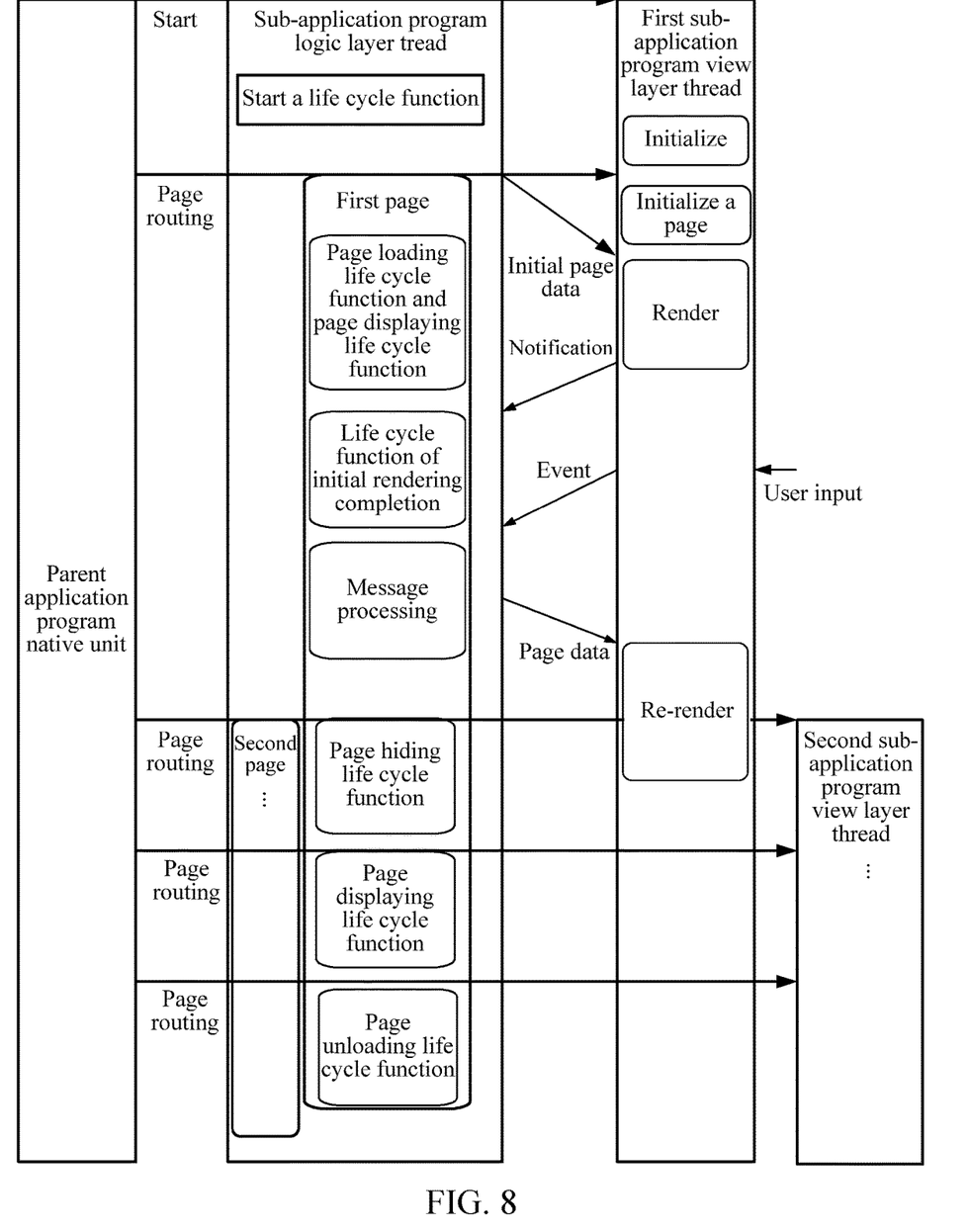
FIG. 8 is a schematic view of a life cycle of a sub-application program page according to an embodiment.

Referring to FIG. 8, the principle of the application program page processing method is described with a specific embodiment. After acquiring the sub-application program identifier, the parent application program native unit starts a sub-application program logic layer tread and a first sub-application program view layer thread corresponding to the sub-application program identifier.

When being started, the sub-application program logic layer tread pre-loads the public resource required by the sub-application program logic layer tread through starting the life cycle function, and registers the logic code of each sub-application program page. The first sub-application program view layer thread loads and generates the public resource required by the sub-application program page when being started.

After determining to load the first page, the parent application program native unit notifies the sub-application program logic layer tread and the first sub-application program view layer thread. The sub-application program logic layer tread sends the initial page data of the first page to the first sub-application program view layer thread, and performs an action defined by a page loading life cycle function and an action defined by a page displaying life cycle function.

The first sub-application program view layer thread receives the initial page data of the first page after initialization, renders the first page according to the initial page data of the first page, and sends an initial rendering completion notification to the sub-application program logic layer tread after rendering.

After receiving the initial rendering completion notification, if receiving an event sent by the first sub-application program view layer thread, the sub-application program logic layer tread generates the updated page data of the first page according to the event processing function corresponding to the event, and sends the updated page data to the first sub-application program view layer thread. The first sub-application program view layer thread re-renders the updated part in the first page according to the updated page data.

Furthermore, the parent application program native unit can further control switching the first page to the second page, with a result that the life cycle state of the first page is changed to the page hiding state or the page unloading state, and notifies the second sub-application program view layer thread to load the second page. The parent application program native unit can further control switching the second page to the first page, with a result that the life cycle state of the first page is changed to the page displaying state. The sub-application program logic layer tread can perform an action defined by the life cycle function corresponding to the changed life cycle state when monitoring the life cycle state of the first page is changed.

Figure 9:
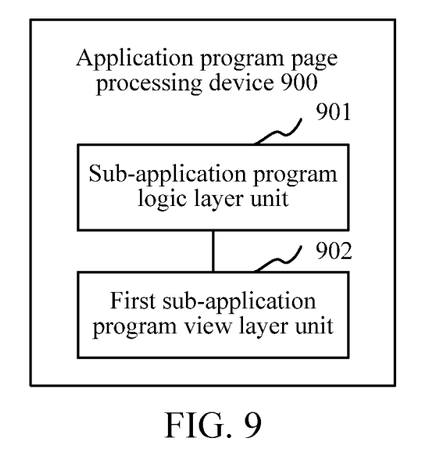
FIG. 9 is a structural block diagram of an application program page processing device according to an embodiment.

FIG. 9 is a structural block diagram of an application program page processing device 900 according to an embodiment. Referring to FIG. 9, the application program page processing device 900 includes a sub-application program logic layer unit 901 and a first sub-application program view layer unit 902.

The sub-application program logic layer unit 901 is configured to acquire initial page data of a first page according to logic code of the first page and send the initial page data of the first page to the first sub-application program view layer unit 902 corresponding to the first page. The sub-application program logic layer unit 901 and the first sub-application program view layer unit 902 run in an environment provided by the parent application program, and the parent application program runs on an operating system.

The first sub-application program view layer unit 902 is configured to render the first page according to the initial page data of the first page, and feed back an initial rendering completion notification to the sub-application program logic layer unit 901. The first sub-application program view layer unit 902 runs in an environment provided by the parent application program.

The sub-application program logic layer unit 901 is further configured to receive the initial rendering completion notification, then acquire the updated page data, and send the updated page data to the first sub-application program view layer unit 902.

The first sub-application program view layer unit 902 is further configured to re-render the updated part in the first page according to the updated page data.

For the application program page processing device 900, the parent application program runs on the operating system, the parent application program provides a running environment for the sub-application program logic layer unit and the first sub-application program view layer unit, acquires the initial page data through the sub-application program logic layer unit, and implements rendering of the first page through the first sub-application program view layer unit. Thus, when the parent application program is running, the page that belongs to the sub-application program can be implemented, thereby saving time of installing the application program and enhancing the use efficiency of the sub-application. Furthermore, when the first page is changed, only the updated part needs to be rendered, thereby further enhancing the use efficiency of the application program. Furthermore, the sub-application program logic layer unit and the first sub-application program view layer unit separate the view layer and the logic layer of the application program, so as to implement and maintain the sub-application program conveniently.

Figure 10:
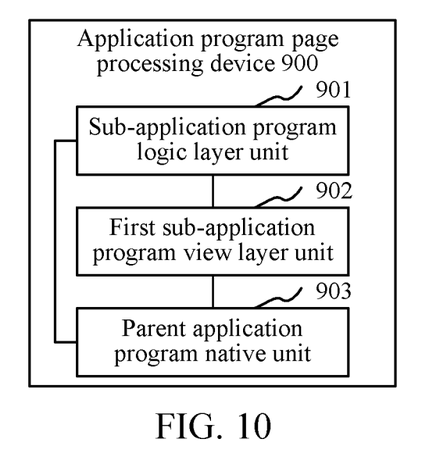
FIG. 10 is a structural block diagram of an application program page processing device according to another embodiment.

FIG. 10 is a structural block diagram of an application program page processing device according to another embodiment. Referring to FIG. 10, the application program page processing device 900 includes a sub-application program logic layer unit 901, a first sub-application program view layer unit 902, and a parent application program native unit 903.

The parent application program native unit 903 is configured to acquire a sub-application program identifier, acquire sub-application program global configuration code corresponding to the sub-application program identifier, and start the sub-application program logic layer unit 901 and the first sub-application program view layer unit 902 according to the sub-application program global configuration code.

The sub-application program logic layer unit 901 is further configured to register the logic code of the first page when the sub-application program logic layer unit 901 is started.

The first sub-application program view layer unit 902 is further configured to initialize when the first sub-application program view layer unit 902 is started, and send an initialization completion notification to the sub-application program logic layer unit 901 after initialization.

The sub-application program logic layer unit 901 is further configured to receive the initialization completion notification, then acquire the initial page data of the first page through the sub-application program logic layer unit 901 according to the logic code of the first page, and send the initial page data of the first page to the first sub-application program view layer unit 902 corresponding to the first page.

In this embodiment, the parent application program native unit can acquire the sub-application program identifier and then start the sub-application program logic layer unit and the first sub-application program view layer unit, the sub-application program logic layer unit completes the registration of the logic code of the first page when being started, the first sub-application program view layer unit performs initialization when being started, and implements rendering and re-rendering of the first page through the sequential interaction between the sub-application program logic layer unit and the first sub-application program view layer unit after initialization, thereby ensuring that the first page can be rendered and updated successfully.

In an embodiment, the first sub-application program view layer unit 902 is further configured to render the first page according to the public component provided by the parent application program and the initial page data of the first page, and feed back the initial rendering completion notification to the sub-application program logic layer unit 901.

In an embodiment, the sub-application program logic layer unit 901 is further configured to receive the initial rendering completion notification.

The first sub-application program view layer unit 902 is further configured to acquire a public component binding event triggered for the public component in the first page, and transmit the public component binding event to the sub-application program logic layer unit 901.

The sub-application program logic layer unit 901 is further configured to make a response to the public component binding event according to the logic code of the first page, acquire the updated page data, and send the updated page data to the first sub-application program view layer unit 902.

In this embodiment, the parent application program can provide a public component so that the first sub-application program view layer unit can construct the first page quickly, thereby further enhancing the use efficiency of the application program. Furthermore, the first sub-application program view layer unit is responsible for performing initial rendering and re-rendering on the first page and perception of the public component binding event, and the sub-application program logic layer unit performs logic processing on the public component binding event, maintenance can be performed easily for the view layer and the logic layer are separated and interaction logic of the first page can be implemented more easily for the public component binding event is bound with the corresponding public component, thereby reducing development difficulty.

Figure 11:
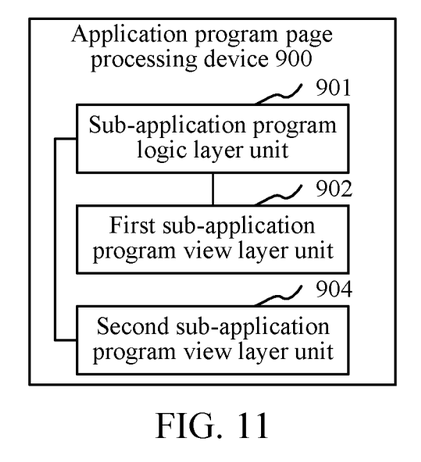
FIG. 11 is a structural block diagram of an application program page processing device according to further another embodiment.

FIG. 11 is a structural block diagram of an application program page processing device 900 according to further another embodiment. Referring to FIG. 11, the application program page processing device 900 includes a sub-application program logic layer unit 901, a first sub-application program view layer unit 902, and a second sub-application program view layer unit 904.

The sub-application program logic layer unit 901 is further configured to acquire a page switching event triggered for a first page, and determine a second page matching the page switching event according to logic code of the first page.

The sub-application program logic layer unit 901 is further configured to acquire page data of a second page and send the page data of the second page to the second sub-application program view layer unit 904 corresponding to the second page.

The second sub-application program view layer unit 904 is configured to render the second page according to the page data of the second page.

In this embodiment, different sub-application program pages are maintained by different sub-application program view layer units, and page logic management is performed by the same sub-application program logic layer unit, so as to facilitate routing between sub-application program pages and development and maintenance of application programs.

In an embodiment, the sub-application program logic layer unit 901 is further configured to acquire the page data of the second page through the sub-application program logic layer unit 901 according to the logic code of the first page when the page switching event is an event of switching to a new page, load the page data of the second page into a page stack, and send the page data of the second page to the second sub-application program view layer unit 904 corresponding to the second page.

In an embodiment, the sub-application program logic layer unit 901 is further configured to read the page data of the second page from the page stack through the sub-application program logic layer unit 901 when the page switching event is an event of switching to a page that is accessed last time, and send the page data of the second page to the second sub-application program view layer unit 904 corresponding to the second page.

In this embodiment, the page stack is configured to temporarily store the accessed sub-application program pages, so as to return each of the accessed sub-application program pages layer by layer.

In an embodiment, the parent application program native unit 903 is further configured to trigger the life cycle state of the first page to change.

The sub-application program logic layer unit 901 is further configured to perform an action defined by a life cycle function in the logic code of the first page corresponding to the changed life cycle state when monitoring the life cycle state of the first page is changed.

In this embodiment, the parent application program can trigger a change of the life cycle state of the first page, and perform a corresponding pre-defined action through the sub-application program logic layer unit according to the change of the life cycle state of the first page, so that the sub-application program can implement more functions and the application scope of the sub-application program becomes wider.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the steps of the method in the foregoing embodiments may be implemented by a computer program instructing relevant hardware. The computer program may be stored in a computer readable storage medium. When the program is executed, the flows of the embodiments of each of the foregoing methods may be included. The storage medium may be a non-volatile (or non-transitory) storage medium such as a magnetic disc, an optical disc, and a Read-Only Memory (ROM), or a Random Access Memory (RAM).

The technical features of the embodiments can be combined randomly, and for simplified description, not all possible combinations of the technical features in the embodiments are described. However, the combinations of the technical features should all be considered to fall in the scope of the disclosure of the specification as long as they are not contradictory.

The foregoing embodiments only describe several implementation manners of this application, and the description is specific and detailed, but cannot therefore be understood as a limitation to the scope of the present disclosure. It should be noted that a person of ordinary skill in the art may further make variations and improvements without departing from the conception of this application, and these all fall within the protection scope of this application. Therefore, the patent protection scope of this application should be subject to the appended claims.

What is claimed is:

1. A method for information processing, comprising:
executing, by processing circuitry of a terminal device, a first application program in an operating system;
acquiring, by the processing circuitry and via the first application program, a code package of a sub-application program;
executing, by the processing circuitry and via the first application program, the sub-application program, the execution of the sub-application program starting a first process and a second process corresponding to the sub-application program;
forwarding, by the processing circuitry and via the first application program, page data and event data between the first process and the second process of the sub-application program;
rendering and updating, by the processing circuitry and via the sub-application program, a first view page according to the page data and the event data; and
performing at least one of the forwarding, the rendering, and the updating by invoking, by the sub-application program, a protocol of the operating system.

2. The method of claim 1, further comprising:
transferring, by the processing circuitry and via the first application program, updated data for a portion of the first view page from the first process to the second process of the sub-application program; and
re-rendering, by the processing circuitry and in the first process, the portion of the first view page according to the updated data for the portion of the first view page.

3. The method of claim 1, further comprising:
acquiring, by the processing circuitry and via the first application program, global configuration codes of the sub-application program based on a program identifier of the sub-application program;
starting, by the processing circuitry and via the first application program, the first process and the second process according to the global configuration codes of the second sub-application program;
registering, by the processing circuitry and in the first process, first logic code of the first view page when the first process of the sub-application program starts;
acquiring, by the processing circuitry and in the first process, first page data of the first view page, according to the first logic code, after completion of an initialization in the second process; and
sending, by the processing circuitry and via the first application program, the first page data of the first view page, from the first process to the second process corresponding to the first view page.

4. The method of claim 3, further comprising:
starting, by the processing circuitry and via the first application program, the first process according to a global logic code in the global configuration codes of the sub-application program; and
starting, by the processing circuitry and via the first application program, the second process according to a global feature of the first view page that is defined by global page configuration codes in the global configuration codes of the sub-application program, the global page configuration codes defining global features for view pages of the sub-application program.

5. The method of claim 1, further comprising:
acquiring, by the processing circuitry and in the second process, a public component from the first application program, according to a page configuration file of the sub-application program, the public component being shared by different application programs that are executed by the first application program, wherein
the rendering includes rendering, by the processing circuitry and in the second process, the first view page according to the public component and the page data of the first view page.

6. The method of claim 5, further comprising:
acquiring, by the processing circuitry and in the second process, a selection event associated with the public component;
forwarding, by the processing circuitry and via the first application program, the selection event from the second process to the first process; and
generating, by the processing circuitry and in the first process of the sub-application program via an application programming interface (API) provided by the first application program, updated page data for a portion of the first view page in response to the selection event, according to first logic code of the first view page.

7. The method of claim 1, further comprising:
acquiring, by the processing circuitry and in the first process, an event that triggers a switching from the first view page to a second view page;
acquiring, by the processing circuitry and in the first process, second page data of the second view page;
transferring, by the processing circuitry and via the first application program, the second page data of the second view page from the first process to a third process corresponding to the second view page, the execution of the sub-application program starting the third process after the second process starts; and
rendering, by the processing circuitry and in the third process, the second view page according to the second page data of the second view page.

8. The method of claim 7, further comprising:
when the second view page is a new view page, acquiring, by the processing circuitry and in the first process, the second page data according to first logic code of the first view page; and
loading, by the processing circuitry and in the first process, the second page data into a page stack that buffers view pages.

9. The method of claim 8, further comprising:
when the second view page has been accessed previously, acquiring, by the processing circuitry and in the first process, the second page data from the page stack, the page stack buffering the view pages that have been accessed previously.

10. The method of claim 1, further comprising:
triggering a state change of the first view page from a first state to a second state; and
performing, by the processing circuitry, an operation that is defined in first logic code of the first view page by a function associated with the second state.

11. An apparatus, comprising:
a storage medium storing a first application program; and
processing circuitry configured to:
execute the first application program in an operating system;
acquire, via the first application program, a code package of a sub-application program;
execute, via the first application program, the sub-application program, the execution of the sub-application program starting a first process and a second process corresponding to the sub-application program;
forward, via the first application program, page data and event data between the first process and the second process of the sub-application program;
render and update, in the sub-application program, a first view page according to the page data and the event data; and
perform at least one of the forwarding, the rendering, and the updating by invoking, by the sub-application program, a protocol of the operating system.

12. The apparatus of claim 11, wherein the processing circuitry is further configured to:
transfer, by the processing circuitry and via the first application program, updated data for a portion of the first view page from the first process to the second process of the sub-application program; and
re-render, by the processing circuitry and in the first process, the portion of the first view page according to the updated data for the portion of the first view page.

13. The apparatus of claim 11, wherein the processing circuitry is further configured to:
acquire, via the first application program, global configuration codes of the sub-application program based on a program identifier of the sub-application program;
start, via the first application program, the first process and the second process according to the global configuration codes of the sub-application program;
register, in the first process, first logic code of the first view page when the first process of the sub-application program starts;
acquire, in the first process, first page data of the first view page, according to the first logic code, after completion of an initialization in the second process; and
send, via the first application program, the first page data of the first view page, from the first process to the second process corresponding to the first view page.

14. The apparatus of claim 13, wherein the processing circuitry is further configured to:
start, via the first application program, the first process according to a global logic code in the global configuration codes of the sub-application program; and
start, via the first application program, the second process according to a global feature of the first view page that is defined by global page configuration codes in the global configuration codes of the sub-application program, the global page configuration codes defining global features for view pages of the sub-application program.

15. The apparatus of claim 11, wherein the processing circuitry is further configured to:
acquire, in the second process, a public component from the first application program, according to a page configuration file of the sub-application program, the public component being shared by different application programs that are executed by the first application program; and
render, in the second process, the first view page according to the public component and the page data of the first view page.

16. The apparatus of claim 15, wherein the processing circuitry is further configured to:

acquire, in the second process, a selection event associated with the public component;

forward, via the first application program, the selection event from the second process to the first process; and generate, in the first process of the sub-application program via an application programming interface (API) provided by the first application program, updated page data for a portion of the first view page in response to the selection event, according to first logic code of the first view page.

17. The apparatus of claim 11, wherein the processing circuitry is further configured to:

acquire, in the first process, an event that triggers a switching from the first view page to a second view page;

acquire, in the first process, second page data of the second view page;

transfer, via the first application program, the second page data of the second view page from the first process to a third process corresponding to the second view page, the execution of the sub-application program starting the third process after the second process starts; and render, in the third process, the second view page according to the second page data of the second view page.

18. The apparatus of claim 17, wherein the processing circuitry is further configured to:

when the second view page is a new view page,
acquire, in the first process, the second page data according to first logic code of the first view page; and load, in the first process, the second page data into a page stack that buffers view pages; and when the second view page has been accessed previously,
acquire, in the first process, the second page data from the page stack, the page stack buffering the view pages that have been accessed previously.

19. The apparatus of claim 11, wherein the processing circuitry is further configured to:

trigger a state change of the first view page from a first state to a second state; and perform an operation that is defined in first logic code of the first view page by a function associated with the second state.

20. A non-transitory computer readable medium storing computer-readable instructions therein which when executed by a computer cause the computer to perform:

executing a first application program in an operating system;

acquiring, via the first application program, a code package of a sub-application program;

executing, via the first application program, the sub-application program, the execution of the sub-application program starting a first process and a second process corresponding to the sub-application program;

forwarding, via a thread or a process of the first application program, page data and event data between the first process and the second process of the sub-application program;

rendering and updating, via the sub-application program, a first view page according to the page data and the event data; and performing at least one of the forwarding, the rendering, and the updating by invoking, by the sub-application program, a protocol of the operating system.

* * * * *